(12) United States Patent
Rose et al.

(10) Patent No.: US 8,019,802 B2
(45) Date of Patent: Sep. 13, 2011

(54) CRYPTOGRAPHICALLY SECURE PSEUDO-RANDOM NUMBER GENERATOR

(75) Inventors: Gregory Gordon Rose, Dan Diego, CA (US); Alexander Gantman, Poway, CA (US); Lu Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1020 days.

(21) Appl. No.: 11/509,215

(22) Filed: Aug. 23, 2006

(65) Prior Publication Data

US 2007/0230694 A1    Oct. 4, 2007

Related U.S. Application Data

(60) Provisional application No. 60/711,148, filed on Aug. 24, 2005.

(51) Int. Cl.
*G06F 7/58* (2006.01)

(52) U.S. Cl. ...................................... 708/254

(58) Field of Classification Search .................. 380/268, 380/36–37, 263, 44–47; 708/250–256
See application file for complete search history.

(56) References Cited

U.S. PATENT DOCUMENTS

| | | | |
|---|---|---|---|
| 5,778,069 | A | 7/1998 | Thomlinson et al. |
| 6,628,786 | B1 | 9/2003 | Dole |
| 7,894,602 | B2* | 2/2011 | Mueller et al. ................. 380/46 |
| 2004/0071289 | A1 | 4/2004 | Rose et al. |
| 2004/0162864 | A1* | 8/2004 | Nowshadi et al. ............ 708/254 |
| 2005/0120065 | A1* | 6/2005 | Dirscherl et al. ............. 708/250 |
| 2008/0263117 | A1* | 10/2008 | Rose et al. .................... 708/254 |
| 2009/0049111 | A1* | 2/2009 | Chari et al. ................... 708/254 |
| 2010/0005128 | A1* | 1/2010 | Ergun ............................. 708/251 |
| 2010/0054466 | A1* | 3/2010 | Kerins et al. .................... 380/46 |

FOREIGN PATENT DOCUMENTS

| | | |
|---|---|---|
| JP | 06342257 | 12/1994 |
| JP | 07036672 | 2/1995 |
| JP | 2000244480 | 9/2000 |
| TW | 584294 | 4/2004 |
| TW | 1227439 | 2/2005 |
| WO | WO2005062523 | 7/2005 |

OTHER PUBLICATIONS

Author: Hawkes et al.; Title: Primitive Specification for SOBER-128; Date: 2003; URL: http://eprint.iacr.org/2003/081.pdf.*

(Continued)

*Primary Examiner* — David H Malzahn
(74) *Attorney, Agent, or Firm* — Won Tae Kim

(57) ABSTRACT

A cryptographically secure pseudo-random number generator is configured to obtain one or more unpredictable sources of entropy that provide a seed. A current internal state of the number generator is modified as a function of the current internal state and the seed to accumulate entropy. The modified internal state may be obtained by using non-linear feedback shift register operations on the internal state and the seed. A pseudo-random number is then generated based on the modified internal state of the number generator. The one or more unpredictable sources of entropy may be combined into the seed. The internal state of the number generator may be continually modified with additional seeds obtained from the one or more unpredictable sources and the current internal state. Additionally, the internal state of the number generator may be modified on demand with a new seed received from a calling application.

36 Claims, 5 Drawing Sheets

OTHER PUBLICATIONS

Author: Kelsey et al; Title: "Yarrow-160: Notes on the Design and Analysis of the Yarrow Cryptographic Pseudorandom Number Generator"; Date: 1999; URL: http://www.schneier.com/paper-yarrow.html.*

Author: Ferguson; Title: The Fortuna PRNG; Date: 2003; URL: http://th.informatik.uni-mannheim.de/people/lucks/papers/Ferguson/Fortuna.ppt.*

Author: IBM; Title: FIPS140-2 Security Policy for CyrptoLite; Date Oct. 2003; URL: http://www.cryptsoft.com/fips140/unpdf/140sp354.txt.*

Digital Content Protection LLC, High-bandwidth Digital Content Protection System, Jun. 9, 2003, Revision 1.1.

Steve Babbage, Christophe De Canniere, Josef Lano, Bart Preneel, Joos Vandewalle: "Cryptananalysis of SOBER-t32" [Online] 2003, Springer Berlin/Heidelberg, XP002413853; Retrived from Internet: URL:HTTP://WWW.SPRINGERLINK.COM/CONTENT/13QPG9T3GYVHM0F[=BF3F78EE2E21462EBC1DEEE5660B2BD2&PI=2.

International Search Report and Written Opinion—PCT/US2006/033270, International Search Authority—European Patent Office—Jan. 25, 2007.

* cited by examiner

CRYPTOGRAPHICALLY SECURE PSEUDO-RANDOM NUMBER GENERATOR

CLAIM OF PRIORITY UNDER 35 U.S.C. §119

The present Application for patent claims priority to Provisional Application No. 60/711,148 entitled "Cryptographically Secure Pseudo-Random Number Generator" filed Aug. 24, 2005 and assigned to the assignee hereof and hereby expressly incorporated by reference herein.

BACKGROUND

1. Field

The present invention relates to cryptography and more particularly to a secure generation of pseudo-random numbers in electronic devices.

2. Background

Generation of random numbers has many applications, including cryptographic uses (e.g., keys used for encryption and integrity protection, nonces used for security protocols, etc.) for example. A true random number is impossible to be predicted with probability higher than average. In the real world, it is extremely hard to obtain a perfect random number source.

A physical source, such as thermal noise from a circuit component, sometimes produces very good random output. However, a physical source is exposed to external interference, which can make the output bear a significant bias. Moreover, a physical source is limited in how quickly it can provide new entropy (randomness). Many applications cannot afford to wait a long time for random numbers. Additionally, hardware-dependent generators sometimes fail after an extended period of time and produce very bad random numbers in such cases.

A pseudo-random number generator (PRNG) is often employed that uses a deterministic algorithm to generate pseudo-random numbers. The PRNG can produce numbers at a very fast speed. Given a random input called a seed, a very long sequence of pseudo-random numbers can be generated deterministically. Without knowledge of this seed, it is infeasible or very hard to distinguish the generator from a random source. While there are many PRNGs available, most are not designed for security applications. Because PRNGs use deterministic algorithms, they are exposed to hacking, thereby weakening the security of the PRNG. For example, a linear congruential generator is widely used as a PRNG but can be broken after a short sequence of output is analyzed.

Cryptographic applications typically use "random" numbers for initialization vectors, keys, nonces, salts, etc. Generally, a cryptographically secure PRNG (CSPRNG) is seeded with unpredictable inputs in a secure way so that it is infeasible to distinguish its output from a sequence of random bits. As defined herein, a CSPRNG has all properties of a normal PRNG, and, in addition, at least two other properties. One of these properties, referred to as the "next bit test", states that given a sequence of m bits generated from a generator, no feasible method can predict the (m+1)-th bit with probability significantly higher than one half. The second property, referred to a "malicious seeding resistance", states that even if an attack can gain full or partial control of the inputs to the CSPRNG for a period of time, it is still infeasible to predict or reproduce any random output from the CSPRNG.

A pseudo-random number generation scheme is relatively straightforward in a CSPRNG. It can be, for example, a block cipher running in counter mode or output feedback mode, a stream cipher using a seed as cipher key, or a nested structure of hashing. A complicated part in CSPRNG design is how to seed and reseed the CSPRNG. Reseeding is a process used to update the sequential logic of a CSPRNG, which has been previously seeded, with a new seed. Such reseeding makes it more difficult to break a deterministic number generation algorithm.

There exist a number of standardized CSPRNG designs, such as FIPS 186-2, ANSI X9.17-1985 Appendix C, ANSI X9.31-1998 Appendix A.2.4, and ANSI X9.62-1998 Annex A.4. Unfortunately, many of these designs are not satisfactory under certain circumstances. For example, two design flaws of ANSI X9.17 PRNG have been identified by J. Kelsey et al. at Fast Software Encryption, 5th International Workshop Proceedings, Springer-Verlag, 1998.

Yarrow and Fortuna are two well-known CSPRNG designs. (See "Yarrow-160: Notes on the Design and Analysis of the Yarrow Cryptographic Pseudorandom Number Generator", by J. Kelsey, B. Schneier, and N. Ferguson, Sixth Annual Workshop on Selected Areas in Cryptography, Springer Verlag, August 1999, and "Practical Cryptography", by N. Ferguson and B. Schneier, published by Wiley in 2003.

Both Yarrow and Fortuna have reseeding controls with support from complicated schemes for entropy accumulation. Yarrow does not specify a concrete method to evaluate entropy for reseeding while Fortuna reseeds the system periodically when the fastest entropy pool source is ready. Both of them use block ciphers in counter mode for pseudo-random number generation and use hash algorithms extensively for reseeding. Use of block ciphers in counter mode and hash algorithms for reseeding is computationally expensive and time consuming.

Therefore, there is a need for a better, less complex and/or more efficient pseudo-random number generator.

SUMMARY

A method is provided for operating a secure pseudo-random number generator. The method comprises (1) obtaining one or more unpredictable sources of entropy to provide a seed, (2) accumulating entropy in an internal state of the number generator by modifying the internal state as a function of a current internal state of the number generator and the seed, and (3) generating a pseudo-random number based on the modified internal state of the number generator. The modified internal state may be obtained by using non-linear feedback shift register operations on the current internal state and the seed. The one or more unpredictable sources of entropy may be combined into the seed.

An initialization seed may be stored upon shutdown of the number generator, wherein the initialization seed is a pseudo-random number generated by the number generator. A startup internal state of the number generator can then be initialized with the stored initialization seed upon startup of the number generator. The initialization seed is stored in a secure file system. Prior to initialization of the startup internal state of the number generator, a determination is made as to whether the integrity of the initialization seed has been compromised. If the integrity of the stored initialization seed has been compromised. An alternative unpredictable source is employed to initialize the startup internal state of the number generator.

A single cryptographic primitive operation is used to obtain the modified internal state for the number generator and generate the pseudo-random number. The single cryptographic primitive operation may be one of either a binary word operation, a bit-shifting operation with constant offsets, or a table lookup.

The number generator may be continuously reseeded from the one or more unpredictable sources to change the internal state of the number generator. The unpredictable sources include physical sources having quantifiable information. Additionally, the number generator may be reseeded with a new seed received from a calling application to change the internal state for the number generator.

The modified internal state of the number generator may be obtained by (1) loading the seed into one or more state registers of the number generator by exclusive-OR operations with a current content of the one or more state registers, (2) feeding the bit-shifted content of a plurality of the state registers to a non-linear function to obtain a result, (3) performing an exclusive-OR operation between the result and one of the one or more state registers to obtain a feedback number, and (4) modifying the one or more state registers by shifting the content from a first state register to a second state register and loading a third state register with the feedback number.

Another feature maintains a counter of the number of times the one or more state registers are shifted between reseeding operations. One of the one or more state registers is then modified based on the counter.

An additional feature maintains an interval counter that changes each time a pseudo-random number is generated. The number generator is reseeded from the one or more unpredictable sources to change the internal state of the number generator only at an interval defined by the interval counter. The number generator may be reseeded with a system time at the interval defined by the interval counter. The seed may be at least one hundred twenty-eight bits long and the internal state of the number generator is eighteen word-size registers.

Another embodiment provides a cryptographically secure number generator comprising: (1) a seed loader configured to obtain one or more unpredictable sources of seed information to provide a seed, (2) a plurality of state registers for storing an internal state of the number generator, wherein the seed loader reseeds the state registers based on a current content of the state registers and the seed to modify the internal state of the number generator and accumulate entropy, and (3) a pseudo-random number generator configured to generate a pseudorandom number based on the modified internal state of the number generator. The modified internal state is obtained by using non-linear feedback shift register operations on the content of the state registers and the seed. The pseudo-random number generator may be further configured to (1) generate an initialization seed upon shutdown of the number generator, and (2) store the initialization seed. The seed loader may also be configured to initialize the plurality of state registers with the stored initialization seed upon restarting of the number generator. The seed loader may be further configured to continuously modify the plurality of state registers with additional seeds obtained from the one or more unpredictable sources. The unpredictable sources may include physical sources having quantifiable information.

The seed loader may also modify the plurality of state registers on demand with a new seed received from a calling application. A single cryptographic primitive operation may be used to reseed the state registers and generate the pseudo-random number.

Another implementation provides a processing circuit comprising a processing device configured to (1) obtain a seed from one or more unpredictable sources of entropy, (2) modify an internal state of a number generator as a function of a current internal state and the seed to accumulate entropy in the number generator, and (3) generate a pseudo-random number based on the modified internal state of the number generator. The processing circuit may also comprise a memory device including one or more internal state registers to store the internal state of the number generator. The processing circuit may be further configured to (1) store an initialization seed in the memory device upon shutdown of the number generator, wherein the initialization seed is a pseudo-random number generated by the number generator, (2) determine whether the integrity of the initialization seed has been compromised prior to initializing a startup internal state of the number generator, and (3) reseed the startup internal state of the number generator with: (a) an alternative unpredictable source if the integrity of the stored initialization seed has been compromised, and (b) the stored initialization seed otherwise. The processing circuit may be further configured to (1)

continuously modify the internal state with additional seeds obtained from the one or more unpredictable sources of seed information, and (2) modify the internal state on demand with a new seed received from a calling application.

Another implementation provides a machine-readable medium having one or more instructions for generating pseudo-random numbers, which when executed by a processor causes the processor to: (1) obtain a seed from one or more unpredictable sources of entropy, (2) modify an internal state of a number generator as a function of a current internal state and the seed to accumulate entropy in the number generator, and (3) generate a pseudo-random number based on the modified internal state of the number generator.

DETAILED DESCRIPTION

Figure 1:
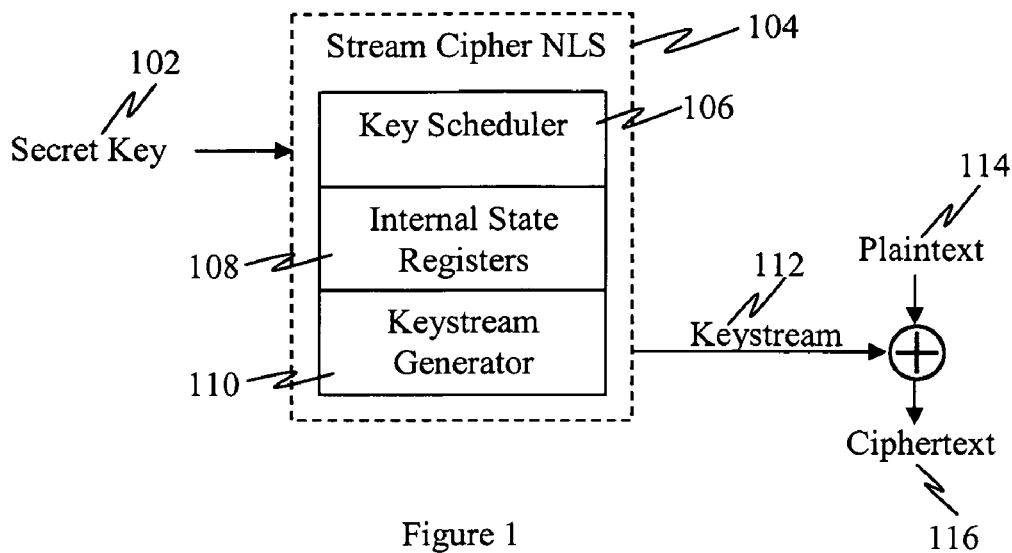
FIG. 1 is a block diagram illustrating a stream cipher NLS that may be modified to implement a cryptographically secure pseudo-random number generator (CSPRNG).

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

One feature provides a novel algorithm for a cryptographically secure pseudo-random number generator (CSPRNG) for reseeding the number generator to obtain pseudo-random sequences for security applications. In one implementation, the stream cipher Non-Linear SOBER (NLS) generator is modified so that a stateful reseeding mechanism keeps accumulating entropy from different physical sources. (See HAWKES, Philip, et al., "Primitive Specification NLS", [on-line], [retrieved on 2006-08-21]. Retrieved from the Internet <URL: www.ecrypt.eu.org/stream/ciphers/nls/nls.pdf>). NLS is a synchronous stream cipher used for generating secret keys based on simple word-oriented operations.

Additionally, unlike the prior art, this reseeding scheme does not reset the number generator to a known state, thus reducing the opportunities for hacking the number generator. Instead, the next state of the generator is a function of the current state and the new seed.

Moreover, another feature provides for a secured seed to be generated and stored prior to the system being shutdown and subsequently used to initialize the system when it is restarted.

Another aspect provides both active and passive reseeding of the CSPRNG. Active reseeding is regularly or continually performed by the generator (CSPRNG). Passive reseeding is performed by applications that invoke the CSPRNG to contribute their own entropy to the generator (CSPRNG) independently. The new entropy changes the state of the sequential logic of the CSPRNG in a way also influenced by the current state. Since there are $2^{576}$ possible states in this novel CSPRNG, no application can deduce the next state based on its own entropy contribution.

Yet another feature is that a stream of pseudo-random numbers may be generated much faster than most current designs. The operations used in a stream cipher NLS are well optimized for 32-bit processors. As a result, random bits are generated much faster in software and embedded hardware than those using block ciphers in counter mode (e.g., Yarrow and Fortuna) which are processor intensive.

Additionally, a less complex structure is provided for reseeding and entropy accumulation, thereby reducing implementation cost and processor demand. Yarrow and Fortuna both require multiple pieces of hash contexts to hold entropy locally. By contrast, the disclosed number generation scheme provides an interface for external applications to call the seed function externally. As a result, no extra local memory needs to be allocated for entropy accumulation. In fact, in some embodiments, only seventy-two (72) bytes may be needed to store the internal state of the generator. During state transitions, the entropy input is diffused in a long range of internal state bits.

Moreover, one implementation of the CSPRNG generates a pseudo-random sequence using nonlinear feedback shift registers. This light-weighted reseeding mechanism and non-linear internal structure are chosen to enhance cryptographic security and optimize system efficiency.

FIG. 1 is a block diagram illustrating a stream cipher NLS that may be modified to implement a cryptographically secure pseudo-random number generator (CSPRNG). In a stream cipher NLS 104, a secret key 102 is used to configure the stream cipher 104 to an undiscoverable state. A key scheduler 106 may configure the state (e.g., sequential logic) of the stream cipher NLS 104. Additionally, internal state registers 108 are maintained by the stream cipher NLS 104. The stream cipher NLS 104 may support a secret key 102 more than one hundred twenty-eight (128) bits long and uses eighteen (18) word-size registers (r[0] to r[16], and Konst) 108 to store the internal register states 108 for the stream cipher NLS 104. The length of the secret key 102 and state registers 108 makes it impractical to attempt to break the stream cipher NLS 104 using a brute force attack. A keystream generator 110 generates an output keystream 112 based on the internal state registers 108 and secret key 102. The output keystream 112 can be used to encrypt plaintext data 114 into ciphertext 116. NLS is an additive stream cipher that mixes the stream cipher output (i.e., keystream) 112 and the plaintext 114 using modulo 2 additions.

The stream cipher NLS 104 may be slightly modified for fast speed random number generation to implement a number generator strong enough for security applications. A simple, effective, and/or efficient seeding and reseeding mechanism is implemented to collect entropy from different sources and generate random numbers securely and with low processing overhead. The next state of the number generator is a function of the current state and the new seed. The number generator is initially seeded by the system with enough random bits from physical sources. Even if the number generator is not reseeded for a long time, deducing the first seed is as hard as breaking a 128-bit key stream cipher, which is computationally infeasible. As a feature of the number generator, the output should be indistinguishable from a sequence of random bits. For example, the pseudo-random output of the number generator may be a number defined as (r[0]+r[16]) (r[1]+r[13])⊕(r[6]+Konst), which is the output algorithm used by a stream cipher NLS. The pseudo-random number(s) may be used as initialization vectors, keys, nonces, salts, etc.

For purposes of illustrating the invention, the number generator may be optimized for 32-bit operations, which can be implemented on 32-bit processors such as Intel Pentium series of CISC (Complex Instruction Set Computer) processors and ARM series of RISC (Reduced Instruction Set Computer) processors. Herein, a "word" refers to a 32-bit string and a "byte" refers to an 8-bit string. However, it would be apparent to one of ordinary skilled in the art that the disclosed CSPRNG may be implemented for other operations with different number of bits.

Figure 2:
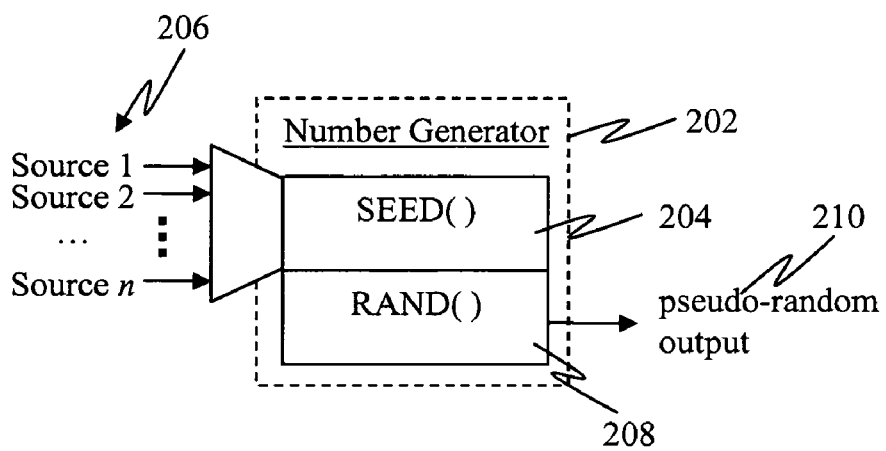
FIG. 2 illustrates how a pseudo-random number generator may be represented as separate functions according to one implementation.

FIG. 2 illustrates how a pseudo-random number generator 202 may be represented as separate functions according to one implementation. A seed function SEED( ) 204 uses one or more unpredictable source 206 as the seed to configure the generator 202. In particular, one or more unpredictable sources 206 may include one or more different physical sources from which the seed is generated. In some implementations, the information from each unpredictable source 206 may be quantified into separate seeds that are sequentially fed to the seed function SEED( ) 204. In other implementations, the information from two or more of the unpredictable sources 206 may be quantified and combined (e.g., multiplexed, XORed, etc.) into a single seed that is fed to the seed function SEED( ) 204 as a parameter. Each time the seed function SEED( ) is invoked with a "seed" as a parameter, the internal state of the number generator 202 is updated (i.e., "reseeded") by a nonlinear operation involving shifting of internal state registers.

A pseudo-random sequence generation function RAND( ) 208 uses the internal state of the number generator 202 to obtain a pseudo-random output 210. The generated pseudo-random number (output) 210 may be used as nonces, initialization vectors, etc.

The unpredictable source 206 may come from different sources of quantifiable information. For example, physical sources, such as transmission errors, noise peaks in a bandwidth, temperature readings of a processor, CDMA searcher, etc., can be used as inputs to the seed.

In cases where some of the input sources 206 are manipulated by hackers, the hacker attacks tend to be defeated by reseeding the number generator 202 from one or more sources, continuously or frequently. Because the seed is continuously or frequently updated with unpredictable inputs 206, the hacker is less able to predict a new pseudo-random output 210 by manipulating some of the input sources 206.

Figure 3:
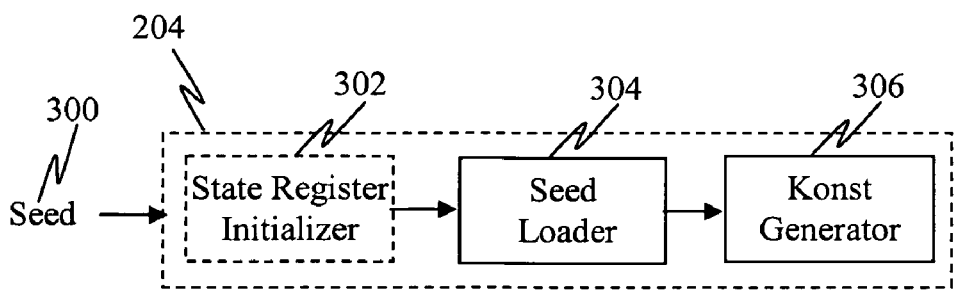
FIG. 3 is a block diagram illustrating one example of a seed function.

FIG. 3 is a block diagram illustrating one example of a seed function 204. A state register initializer 302 (NLS_INIT-STATE) initializes the state registers of a number generator when the number generator is first started. For example, Fibonacci numbers are used to initialize state registers r[0] to r[16]. A Konst register is also initialized to a randomly chosen number (e.g., 0x6996c53a). For instance, a particular fixed value may be used for Konst for interoperability purposes. Second, a seed loader 304 (NLS_LOADKEY) loads a seed 300 into the state registers (r[0] to r[16]) word by word using exclusive-ORs (logical XOR operations, denoted by "⊕"). The length of seed 300 may also be loaded as a word. The seed loader 304 also shifts the state registers (r[0] to r[16]) in a nonlinear feedback mode simultaneously, allowing for the seed 300 to be of any length. Third, a Konst generator 306 (GENKONST) updates the Konst register with a new Konst value based on the current generator state and the current Konst value. This Konst value is used as a constant during pseudorandom number output 210.

Figure 4:
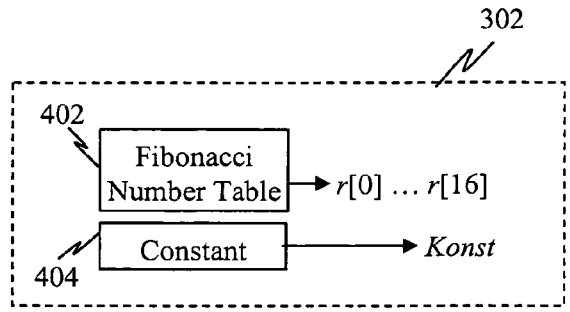
FIG. 4 is a block diagram illustrating one example of a state register initializer used by a seeding function.

FIG. 4 is a block diagram illustrating one example of a state register initializer 302 used by a seeding function 204. When a number generator is first started, its state registers are initialized. The state register initializer 302 may include a Fibonacci Number Table 402 with which the number generator state registers r[0] . . . r[16] are initialized. For example, $r_t[0]=r_t[1]=1$, and $r_t[i]=r_t[i-1]+r_t[i-2]$, for $2 \leq i \leq 16$. A constant 404 is used to initialize a Konst register. The constant 404 value may be any number that preferably has some entropy in its bit sequence.

Figure 5:
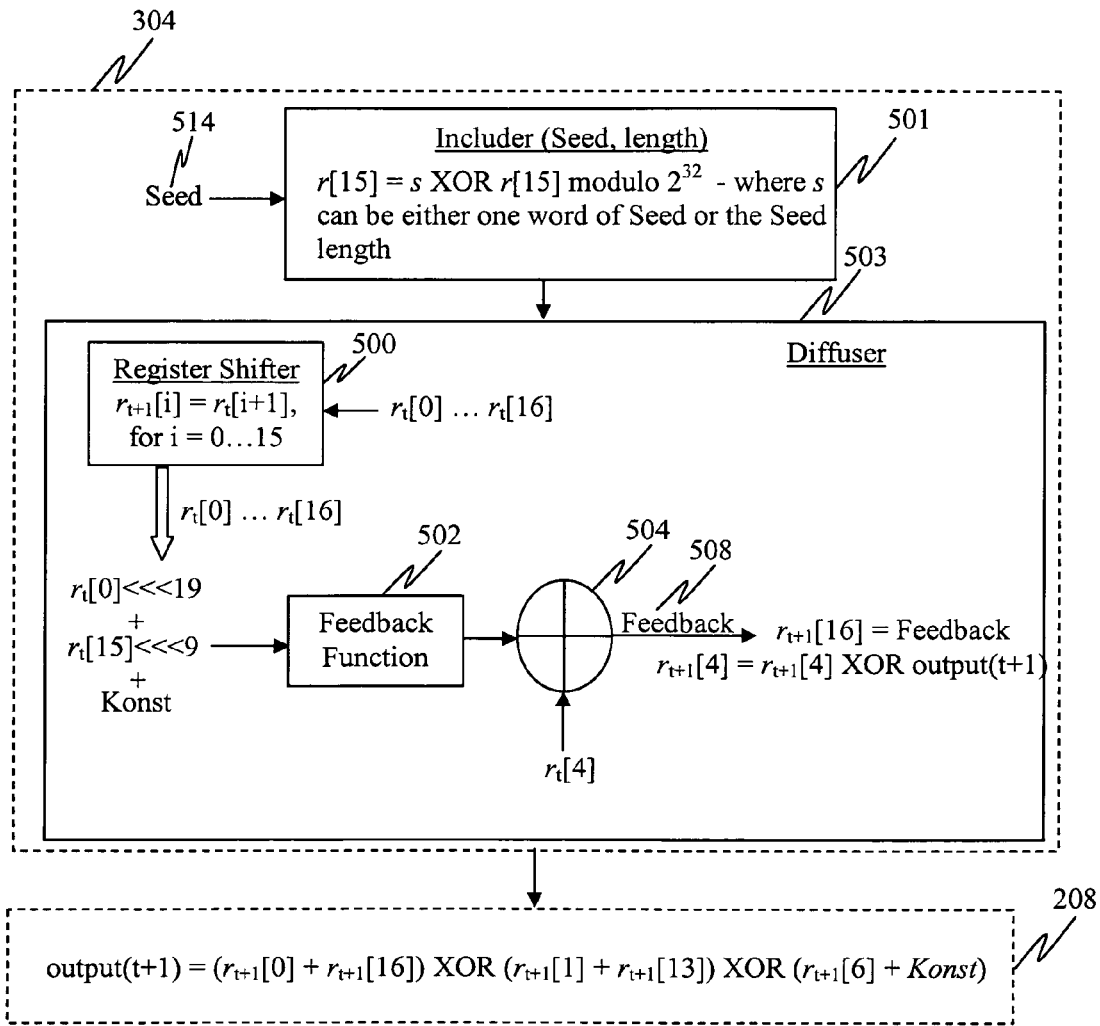
FIG. 5 is a block diagram illustrating functions performed by a seed loader that may be used to seed and/or reseed a number generator according to one example.

FIG. 5 is a block diagram illustrating functions performed by a seed loader 304 that may be used to seed and/or reseed a number generator according to one example. The seed loader 304 may include a non-linear mechanism that ensures every bit of seed input affects every bit of the resulting state registers. (See HAWKES, Philip, et al., "Primitive Specification NLS", [online], [retrieved on 2006-08-21]. Retrieved from the Internet <URL: www.ecrypt.eu.org/stream/ciphers/nls/nls.pdf). An Includer function 501 adds each word of a seed 514 into state register r[15] modulo $2^{32}$. The seed length (in bytes) is also added to state register r[15]. A Diffuser function 503 performs register shifting 500 of state registers r[0] to r[16] such that $r_{t+1}[i]=r_t[i+1]$, for i=0 . . . 15. A feedback function 502 gets its input as $(r_t[0] <<< 19)+(r_t[15] <<< 9)+$ Konst, where "<<<k" denotes left rotation of k bits. The output of the feedback function 502 is XORed 504 with $r_t[4]$ to obtain feedback content 508. State register $r_t[16]$ is set to the feedback content 508 while $r_{t+1}[4]$ is set to $r_{t+1}[4]$ XOR output (t+1), where output (t+1) function 208 is the pseudo-random number output 210. However, when invoked as part of the seed loader 304, the output (t+1) 208 is kept internal to the number generator and not provided to external applications.

The feedback function 502 may perform 32-bit mapping based on four 8×8 Substitution-boxes.

While it is highly unlikely that the output of register shifter 506 will fall into a cycle, it is still possible. To prevent such cyclical output from occurring, a counter t may be used to maintain a count of the number of words shifted by register shifter 506 since the last reseeding operation. Counter t is added to the state registers to prevent cyclical outputs from occurring. For example, r[2] is set to r[2]+t (modulo $2^{32}$) when t is a multiple of ($2^{16}$+1). In other implementations, counter t may be added to a different register(s) (e.g., between r[0] and r[16]) and/or inserted into the register(s) by performing a different operation.

In one implementation, the Seed 514 is loaded using the Includer function 501 and then the Diffuser function 503 is invoked. Then, the seed length is loaded using the Includer function 501 and the Diffuser function 503 is invoked seventeen (17) times to ensure that every bit of seed input affects every bit of the resulting state registers r[0] . . . r[16] in a non-linear manner.

Figure 6:
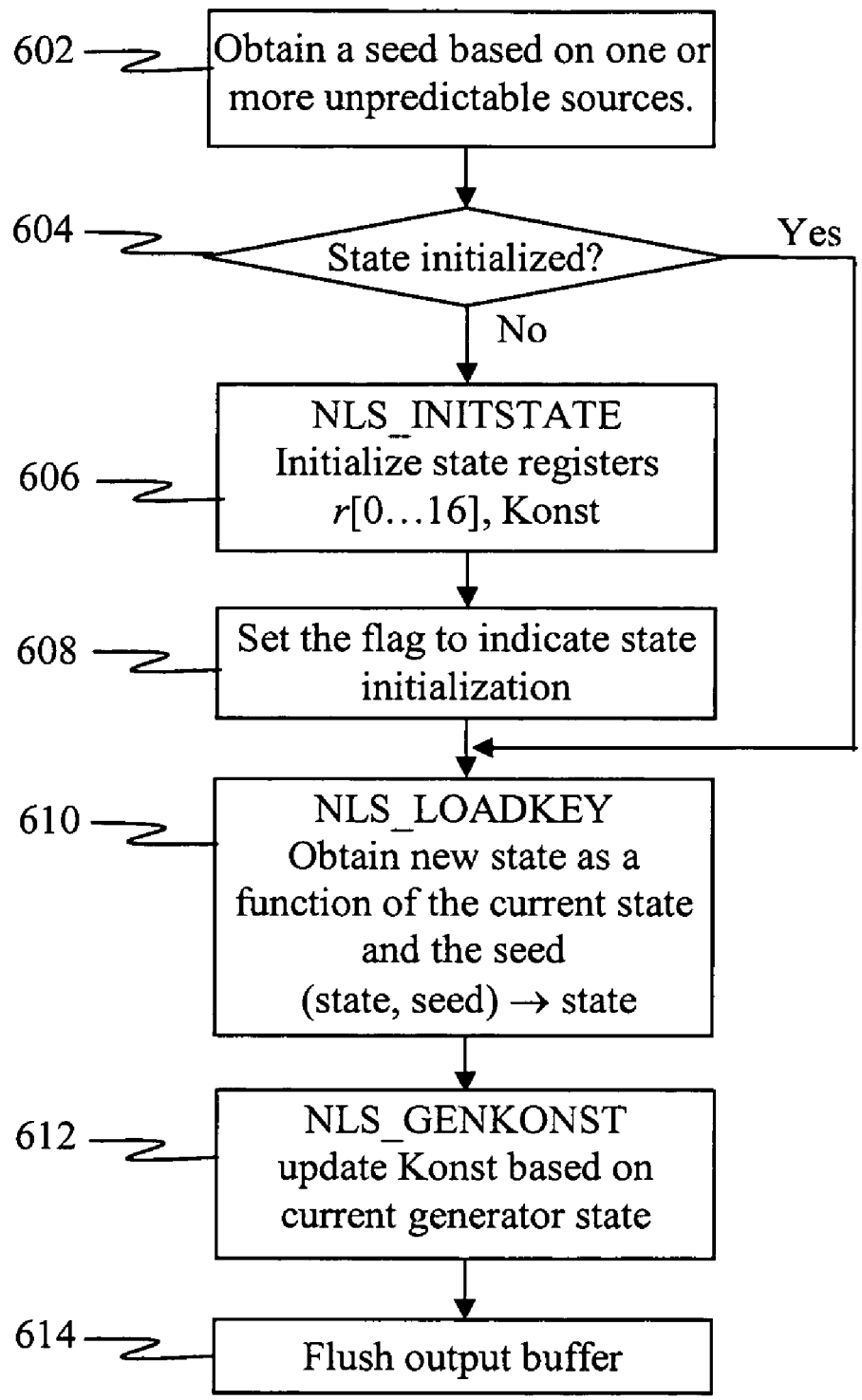
FIG. 6 illustrates a method for executing a seed function modified from NLS key scheduling.

FIG. 6 illustrates a method for executing a seed function modified from NLS key scheduling. A seed is obtained based on one or more unpredictable sources 602 and passed to the seed function as a parameter. A seed is defined as a byte string, of any length, that contains some entropy but is not required to be perfectly random. For example, sources for generating seeds may be obtained by quantifying measurements from physical sources, such as processor temperature, communication link errors, detected frequency peaks within a channel, etc.

When the seed function is invoked, a state_initialized flag is checked 604 to determine if the generator state registers have been initialized. A conventional stream cipher NLS algorithm resets or clears the state registers upon reseeding, thereby failing to accumulate entropy. By contrast, the present modified algorithm accumulates entropy by combining new seeds with current state register (e.g., without clearing the state registers). If it is the first time the seed function has been invoked after the generator is started, the internal state registers are initialized 606 (e.g., r[0] to r[16], Konst, etc.) and the state_initialized flag is set 608 to indicate that the state registers for the generator have been initialized. For example, a NLS_INITSTATE function may be called to initialize the internal state registers predefined for an NLS algorithm. Otherwise, if the he state registers have already been initialized (as denoted by the state_initialized flag being set), the initialization step is skipped.

The seed is passed to the NLS_LOADKEY function where a new state for the number generator is obtained as a function of the current state and the seed 610. For example, the seed and its length are loaded into state registers using XORs so that the new state is a function of both current state and the seed. Consequently, it is not feasible to use the knowledge of a current seed to deduce the previous, current, or next state of the generator. The system continually adds entropy from new, unpredictable seeds, to the number generator. Additionally, the seed function may be invoked by applications calling the number generator. In this sense, an application calls the seed function to contribute entropy for randomness and changes the generator state in an unpredictable way. As a result, reseeding with the same input seeds leads to different outputs at different times. This is distinguishable from a general PRNG, which produces the same output sequence whenever the same seed is used. The value of Konst is then updated based on the current generator state 612. For example, a NLS_GENKONST function may be invoked to obtain the new Konst from the evolving generator state. Konst may be used to mask the output as illustrated previously. The output buffer is flushed 514 to hold new pseudo-random bits for generating the next seed.

For the convenience of implementing a CSPRNG, both the seed and the pseudo-random sequence may be strings in bytes. Because the stream cipher NLS is word-oriented, the seed is padded with 0 to 3 bytes of zeros internally by SEED( ) Similarly, 0 to 3 extra bytes in the last word are discarded before RAND( ) delivers a pseudo-random sequence to the output buffer.

Referring again to FIG. 2, during implementation it may be desirable to seed the generator 202 with several physical sources, either periodically and/or randomly. One suggested source available in CDMA mobile phones is low order energy samples from the searcher. The searcher uses the antenna to get multi-path energy peaks, which provides a continuous source for randomness. Some less random sources can be incorporated such as delay jitter in a packet stream.

The introduction of unpredictable physical sources for randomness of the generator frustrates attacks on the predicting the generator output. In one type of attack, a hacker may control some, but not all, of the physical sources. As a solution, the generator is seeded with all sources during power-up. Since some sources still provide real entropy, the hacker has no way to estimate the state when an output sequence is generated. In another type of attack, a hacker controls all available physical sources used to seed the generator. In such case, an application calling the RAND( ) function 208 may get entropy by seeding the generator itself. For example, the application may seed the generator by calling the SEED( ) function 204 with its own unpredictable event(s) as a source.

Figure 7:
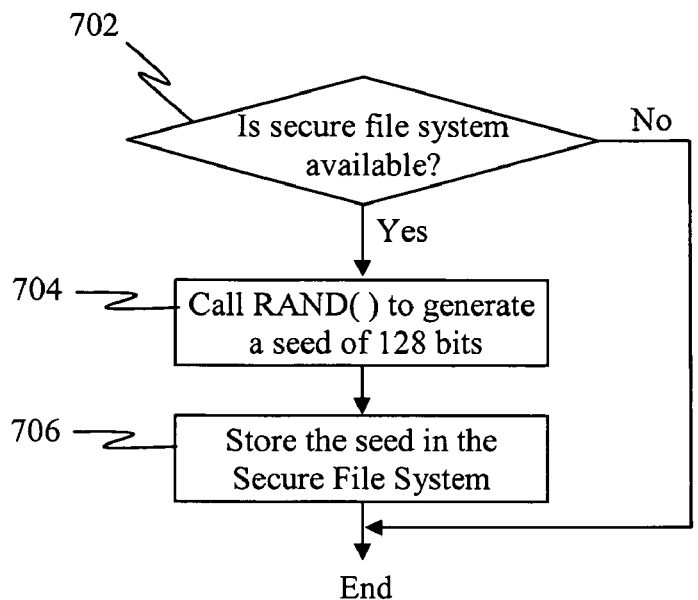
FIG. 7 illustrates a method for storing a seed in a secure file system associated with a pseudo-random number generator.

Depending on the nature of physical sources, the seeding procedure during power-up may be quite time consuming. One improvement is to use a Secure File System (SFS) to store a seed file right before power shutdown. FIG. 7 illustrates a method for storing a seed in a secure file system associated with a pseudo-random number generator. A secure file system makes use of cryptographic primitives to protect confidentiality and integrity of file contents. If a secure file system is available 702, before a device is turned off, the system calls RAND( ) to generate a string of 128 bits as a seed 704. The seed is stored in the SFS as a file 706.

Figure 8:
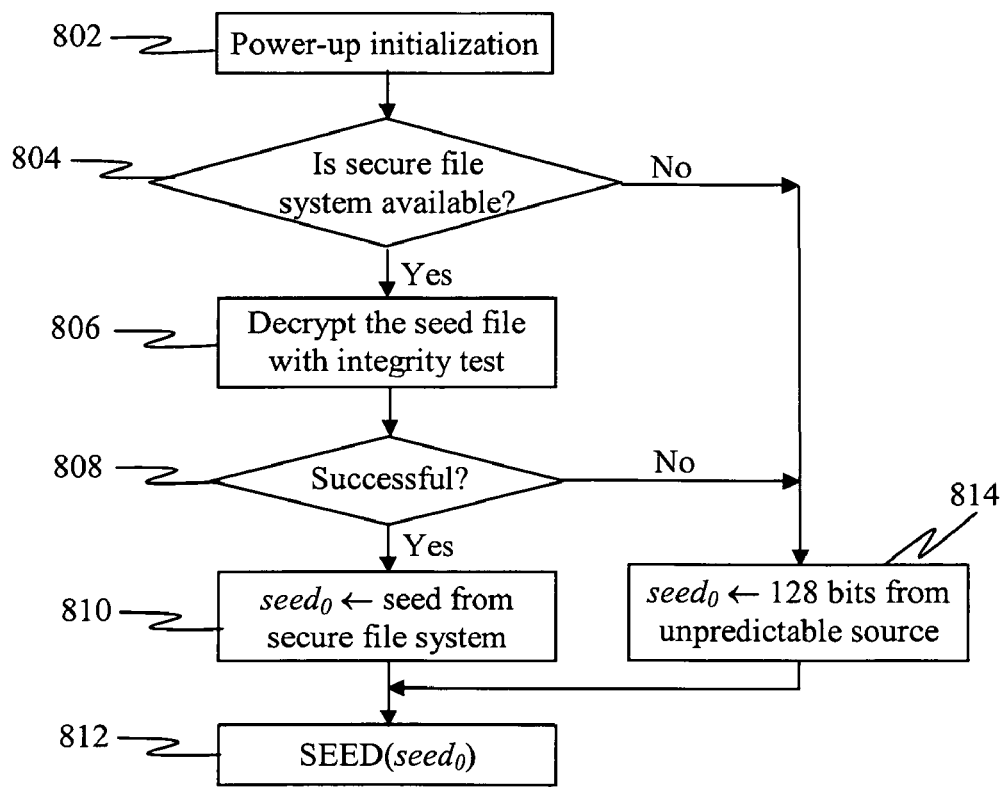
FIG. 8 illustrates a method for using a seed stored in a seed file to initialize a pseudo-random number generator upon startup.

FIG. 8 illustrates a method for using a seed stored in a seed file to initialize a pseudo-random number generator upon startup. For example, a CSPRNG in a CDMA mobile phone may be initialized using this seed file upon startup. Upon power up initialization of a device 802, the system determines if a secure file system is available 804. If the SFS is available during power-up, the seed file is decrypted with integrity verification 806. If successful 808, the content is restored from the seed file 810 and used to seed the SEED( ) function 812. The seed file is removed from SFS once its content has been extracted. When the normal power-down procedure is compromised, such arrangement prevents the same seed from being used for the next time that the phone powers up. If either an SFS is unavailable or the seed file fails the integrity test, an unpredictable source is used to provide 128 bits (for example) as the first seed 814.

According to one feature, an application can add its own entropy by using the SEED( ) function. The seed provided by the application is not required to be perfectly random but only has to include some new entropy. It can be any sort of information, e.g., the system time or CPU cycle counter, for a random number request. Reseeding with predictable data is safe, so the application does not need to "trim" the input data in any way. If predictable data is used to add entropy, it may be used sporadically or in an irregular reseeding pattern so that the application can add its own entropy while preventing a hacker from compromising the generator.

Figure 9:
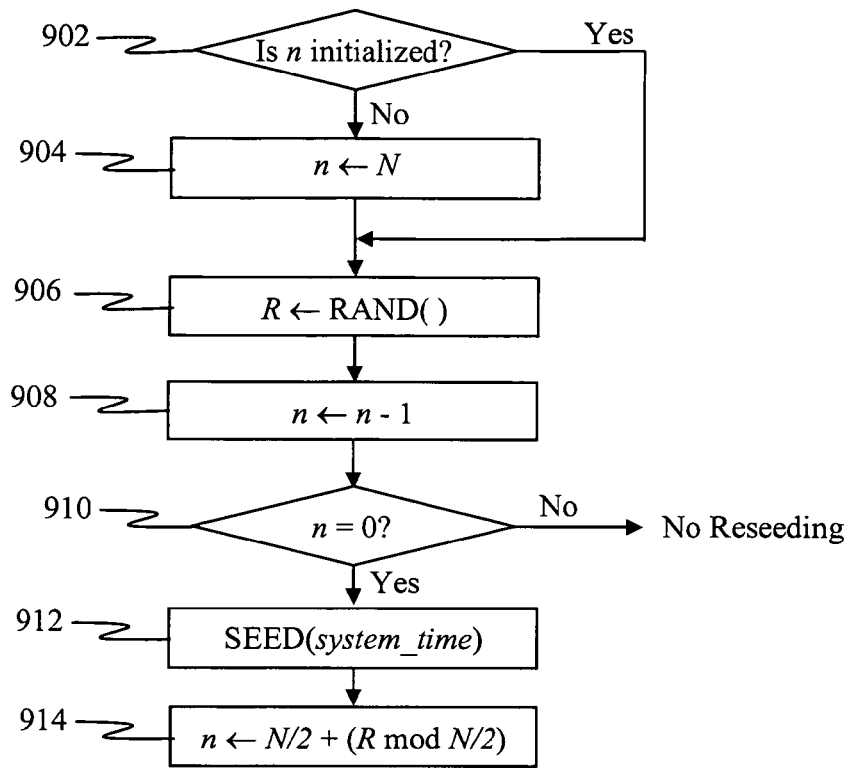
FIG. 9 illustrates how an application may reseed a number generator.

FIG. 9 illustrates how an application may reseed a number generator. A check is performed to determine if counter n has already been initialized 902. If it has not, then counter n is initialized with a parameter N (e.g., 32) 904. A random number R is then generated using the RAND( ) function 906. For each time that RAND( ) is called, the counter n decrements by one 908. When n=0, the number generator is reseeded using the SEED( ) function taking system_time as an input source 912. Counter n is reset to N/2+(R modulo N/2) where R is the latest random number that the application gets 914. Otherwise, if n≠0 910, no reseeding is performed. If reseeding happens too frequently, the system time may not change significantly enough for entropy accumulation. By making reseeding dependent on counter n, the scheme in FIG. 9 ensures that the time between two reseeding calls is long enough (i.e., more than N/2 times of RAND( ) execution). It is harder to predict when to reseed because (R modulo N/2) is involved.

In one implementation, the number generator (i.e., CSPRNG) is run as a server process in protected memory, while applications reseed or request a random sequence from client processes. The data is delivered between the CSPRNG and applications using inter-process communications. In order to mix all random sources together, it is desirable to keep one CSPRNG instance for all applications. That is, the number generator and register states are used for all calling applications.

It should be noted that the seed function SEED( ) and the random output function RAND( ) are atomic and mutually exclusive. Assume, for example, that an attacker has access to both the seed function SEED( ) and random sequence output from the RAND( ) function. The attacker may seed the CSPRNG with some known values with poor entropy. Because the generator (i.e., CSPRNG) has been seeded by other independent sources or from the SFS seed file, it is still infeasible to guess the current state of the CSPRNG. Unless the internal state is disclosed, the output sequence of the RAND( ) function is not predictable.

On the other hand, even if the CSPRNG is running for a long time without reseeding, the complexity of any attack would not be less than breaking the stream cipher NLS. An exhaustive key search would be needed to break the stream cipher NLS and such brute force search is impractical given the key size (e.g., 128 bits) given current key search technology. The random bits generated by the embodiments described herein have passed all tests in the National Institute of Standards and Technology (NIST) Statistical Test Suite for the Validation of Random Number Generators and Pseudo Random Number Generators for Cryptographic Applications (NIST Special Pub. 800-22).

Figure 10:
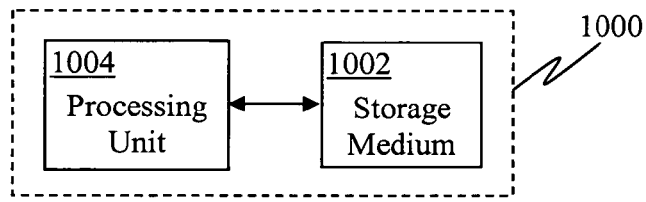
FIG. 10 is a block diagram illustrating a computing device comprising a storage medium and a processor configured to implement a cryptographically secure pseudo-random number generator.

FIG. 10 is a block diagram illustrating a computing device 1000 comprising a storage medium 1002 and a processor 1004 configured to implement a cryptographically secure pseudo-random number generator. The storage medium 1002 may be a memory device and/or hard drive, for example. The storage medium 1002 stores instructions which, when executed by the processor 1004, generate pseudo-random numbers. The instructions may cause the processor 1004 to (1) obtain one or more unpredictable sources of entropy to provide a seed, (2) modify a current internal state of the number generator as a function of the current internal state and the seed to accumulate entropy, (3) generate a pseudo-random number based on the modified internal state of the number generator, (4) combine the one or more unpredictable sources of entropy into the seed, (5) continuously modifying the current internal state with seeds obtained from the one or more unpredictable sources of seed information, and/or (6) modifying the current internal state on demand with information received from a calling application. The processor may be further configured to (1) store an initialization seed upon shutdown of the number generator, wherein the initialization seed is a pseudo-random number generated by the number generator, (2) determine whether the integrity of the initialization seed has been compromised prior to initializing a startup internal state of the number generator, and (3) reseed the startup internal state of the number generator with: (a) an alternative unpredictable source if the integrity of the stored initialization seed has been compromised, and (b) the stored initialization seed otherwise.

Accordingly a number generator is provided, comprising: (1) means for obtaining one or more unpredictable sources of entropy to provide a seed, (2) means for modifying a current internal state of the number generator as a function of the current internal state and the seed to accumulate entropy, and (3) means for generating a pseudo-random number based on the modified internal state of the number generator.

Figure 11:
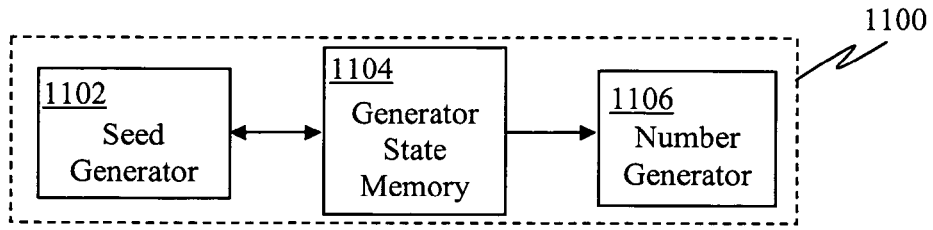
FIG. 11 is a block diagram illustrating a pseudo-random number generator circuit according to one implementation.

FIG. 11 is a block diagram illustrating a pseudo-random number generator circuit 1100 according to one implementation. The pseudo-random number generator circuit 1100 includes a seed generator 1102 that utilizes one or more sources of entropy to generate a seed number, a memory of the generator state 1104, and a number generator 1106 that applies the seed from the seed generator 1102 to obtain a keystream. The generator circuit 1100 may include software and/or embedded hardware components to carry out its functions according to the various embodiments described herein.

According to various implementations, device 1000 and/or device 1100 may be a mobile phone, a personal data assistant, a smart phone, a server, a desktop computer, a laptop computer, an electronic gaming device, or other various electronic devices. Also, while devices 1000 and 1100 have been simplified for purposes of explanation, device 1000 and/or 1100 may comprise other elements or components depending on the implementation.

The novel algorithms described herein may be efficiently implemented in software and/or embedded hardware. In particular, because the present invention provides an interface for external applications to call the seed function SEED( ) externally, no extra local memory needs to be allocated for entropy accumulation. In fact, the number generating algorithms described herein only use 72 bytes to store internal state of the generator, which is attractive in a memory restricted environment. By comparison, the Yarrow and Fortuna algorithms typically require multiple pieces of hash contexts to hold entropy locally (2 and 32 contexts, respectively). Additionally, the block cipher used by Yarrow or Fortuna requires more memory to store round keys.

Some embodiments described herein provide faster reseeding with less overhead than some existing techniques. In particular, reseeding with m bytes of information may take approximately the same time as generating m+72 bytes of pseudo-random output. By comparison, Yarrow hashes entropy input $P_t+2$ times for reseeding, where $P_t$ is non-negative and user-defined parameter. Fortuna has a more complicated reseeding control scheme where 32 entropy pools are involved. If it is assumed, conservatively, that NLS key scheduling algorithm has the same time complexity as a hash function, the CSPRNG performs reseeding at least $P_t+2$ times faster than Yarrow and three (3) times faster than Fortuna.

Yet another feature is that the speed of pseudo-random sequence generation is much faster than block ciphers (e.g., AES) in counter mode. This is because stream cipher NLS uses simple word operations, such as additions, XORs, rotations with constant offsets and table lookups. As a result, a one byte output costs an average of 7.347 clocks on an Intel Centrino processor, for example, which is less processor intensive than using block ciphers in counter mode.

Therefore, the disclosed embodiments may be superior to those of the prior art in a number of ways. For one, they may use only a single cryptographic primitive, rather than a combination of hash functions and block ciphers.

One or more of the components, steps, and/or functions illustrated in FIGS. 1, 2, 3, 4, 5, 6, 7, 8, 9, 10 and/or 11 may be rearranged and/or combined into a single component, step, or function or embodied in several components, steps, or functions without affecting the operation of the pseudo-random number generation. Additional elements, components, steps, and/or functions may also be added without departing from the invention. The apparatus, devices, and/or components illustrated in FIGS. 1, 2, 3, 4, 5, 10 and/or 11 may be configured to perform one or more of the methods, features, or steps described in FIGS. 6, 7, 8 and/or 9.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for operating a secure pseudo-random number generator, comprising:
   providing a new entropy-containing seed from one or more unpredictable sources of entropy;
   modifying a current internal state, stored in state registers of the number generator, as a function of the current internal state and the new entropy-containing seed to generate a modified internal state, wherein the current internal state is based on diffusion of at least one prior entropy-containing seed, and wherein the new entropy-containing seed adds to an entropy of the current internal state to accumulate entropy in the modified internal state; and
   generating a pseudo-random number based on the modified internal state of the number generator.

2. The method of claim 1 wherein the modified internal state is obtained by using non-linear feedback shift register operations on the current internal state and the new entropy-containing seed.

3. The method of claim 1 further comprising:
   combining the one or more unpredictable sources of entropy into the new entropy-containing seed.

4. The method of claim 1 further comprising:
   storing an initialization seed upon shutdown of the number generator, wherein the initialization seed is a pseudo-random number generated by the number generator; and
   initializing a startup internal state of the number generator with the stored initialization seed upon startup of the number generator.

5. The method of claim 4 wherein the initialization seed is stored in a secure file system and further comprising:
   determining whether the integrity of the initialization seed has been compromised prior to initializing the startup internal state of the number generator; and
   employing an alternative unpredictable source to initialize the startup internal state of the number generator if the integrity of the stored initialization seed has been compromised.

6. The method of claim 1 wherein a single cryptographic primitive operation is used to obtain the modified internal state for the number generator and generate the pseudo-random number.

7. The method of claim 6 wherein the single cryptographic primitive operation includes one of either a binary word operation, a bit-shifting operation with constant offsets, or a table lookup.

8. The method of claim 1 further comprising:
   continuously reseeding the number generator from the one or more unpredictable sources to change the internal state of the number generator.

9. The method of claim 8 wherein the unpredictable sources include physical sources having quantifiable information.

10. The method of claim 8 further comprising:
    reseeding the number generator with a new seed received from a calling application to change the internal state for the number generator.

11. The method of claim 1 wherein the secure pseudo-random number generator has a non-linear SOBER structure.

12. The method of claim 11 wherein the modified internal state is obtained by
    loading the new entropy-containing seed into a plurality of state registers of the number generator by exclusive-OR operations with a current content of the plurality of state registers,
    feeding word-shifted content of the plurality of state registers to a non-linear function to obtain a result,
    performing an exclusive-OR operation between the result and one of the plurality of state registers to obtain a feedback number, and
    modifying the plurality of state registers by shifting the content from a first state register to a second state register and loading a third state register with the feedback number, wherein the first state register, the second state register, and the third state register, are included in the plurality of state registers.

13. The method of claim 1 further comprising:
    maintaining a counter of the number of times the plurality of state registers are shifted between reseeding operations; and
    modifying one of the plurality of state registers based on the counter.

14. The method of claim 1 further comprising:
    maintaining an interval counter that changes each time a pseudo-random number is generated; and
    reseeding the number generator from the one or more unpredictable sources to change the internal state of the number generator only at an interval defined by the interval counter.

15. The method of claim 14 further comprising:
    reseeding the number generator with a system time at the interval defined by the interval counter.

16. The method of claim 1 wherein the new entropy-containing seed is at least one hundred twenty-eight bits long and the internal state of the number generator is eighteen word-size registers.

17. A cryptographically secure number generator comprising:
    a seed loader configured to provide a new entropy-containing seed from one or more unpredictable sources of entropy;
    a plurality of state registers for storing an internal state of the number generator, wherein the seed loader on modifies a current internal state as a function of the current internal state and the new entropy-containing seed to generate a modified internal state, wherein the current internal state is based on diffusion of at least one prior entropy-containing seed, and wherein the new entropy-containing seed adds to an entropy of the current internal state to accumulate entropy in the modified internal state; and
    a pseudo-random number generator configured to generate a pseudorandom number based on the modified internal state of the number generator.

18. The number generator of claim 17 wherein the modified internal state is obtained by using non-linear feedback shift register operations on the current internal state of the state registers and the new entropy-containing seed.

19. The number generator of claim 17 wherein the pseudo-random number generator is further configured to
    generate an initialization seed upon shutdown of the number generator; and
    store the initialization seed.

20. The number generator of claim 19 wherein the seed loader is further configured to initialize the plurality of state registers with the stored initialization seed upon restarting of the number generator.

21. The number generator of claim 17 wherein the seed loader is further configured to
continuously load new seeds obtained from the one or more unpredictable sources into the plurality of state registers.

22. The number generator of claim 17 wherein the unpredictable sources include physical sources having quantifiable information.

23. The number generator of claim 17 wherein the seed loader is further configured to
load a new seed obtained from a calling application into the plurality of state registers.

24. The number generator of claim 17 wherein a single cryptographic primitive operation is used to reseed the state registers and generate the pseudo-random number.

25. The number generator of claim 17 wherein the seed loader, plurality of state registers, and pseudo-random number generator are arranged as a non-linear SOBER structure.

26. A number generator, comprising:
means for providing a new entropy-containing seed from one or more unpredictable sources of entropy;
means for modifying a current internal state, stored in state registers of the number generator, as a function of the current internal state and the new entropy-containing seed to generate a modified internal state, wherein the current internal state is based on diffusion of at least one prior entropy-containing seed, and wherein the new entropy-containing seed adds to an entropy of the current internal state to accumulate entropy in the modified internal state; and means for generating a pseudo-random number based on the modified internal state of the number generator.

27. The number generator of claim 26 further comprising:
means for combining the one or more unpredictable sources of entropy into the new entropy-containing seed.

28. The number generator of claim 26 further comprising:
means for storing an initialization seed upon shutdown of the number generator, wherein the initialization seed is a pseudo-random number generated by the number generator;
means for determining whether the integrity of the initialization seed has been compromised prior to initializing a startup internal state of the number generator; and
means for reseeding the startup internal state of the number generator with one of either:
an alternative unpredictable source if the integrity of the stored initialization seed has been compromised, and the stored initialization seed otherwise.

29. The number generator of claim 26 further comprising:
means for continuously modifying the current internal state with additional seeds obtained from the one or more unpredictable sources of entropy; and
means for modifying the current internal state on demand with a new seed received from a calling application.

30. A processing circuit comprising
a processing device configured to
provide a new entropy-containing seed from one or more unpredictable sources of entropy,
modify a current internal state, stored in state registers of a number generator, as a function of the current internal state and the new entropy-containing seed to generate a modified internal state, wherein the current internal state is based on diffusion of at least one prior entropy-containing seed, and wherein the new entropy-containing seed adds to an entropy of the current internal state to accumulate entropy in the modified internal state, and
generate a pseudo-random number based on the modified internal state of the number generator; and
a memory device including one or more internal state registers to store an internal state of the number generator.

31. The processing circuit of claim 30 wherein the processing circuit is further configured to
store an initialization seed in the memory device upon shutdown of the number generator, wherein the initialization seed is a pseudo-random number generated by the number generator;
determine whether the integrity of the initialization seed has been compromised prior to initializing a startup internal state of the number generator; and
reseed the startup internal state of the number generator with one of either:
an alternative unpredictable source if the integrity of the stored initialization seed has been compromised, and the stored initialization seed otherwise.

32. The processing circuit of claim 30 wherein the processing circuit is further configured to
continuously obtain additional seeds from the one or more unpredictable sources of entropy to modify the internal state of the number generator; and
modify the internal state of the number generator based on a new seed received from a calling application.

33. The processing circuit of claim 30 wherein the processing circuit is further configured to modify the current internal state by using a single cryptographic primitive operation and non-linear feedback function based on the current internal state and the new entropy-containing seed.

34. A machine-readable storage medium having one or more instructions for generating pseudo-random numbers, which when executed by a processor causes the processor to:
provide a new entropy-containing seed from one or more unpredictable sources of entropy;
modify a current internal state, stored in state registers of a number generator, as a function of the current internal state and the new entropy-containing seed to generate a modified internal state, wherein the current internal state is based on diffusion of at least one prior entropy-containing seed, and wherein the new entropy-containing seed adds to an entropy of the current internal state to accumulate entropy in the modified internal state; and
generate a pseudo-random number based on the modified internal state of the number generator.

35. The machine-readable storage medium of claim 34 further having one or more instructions which when executed by a processor causes the processor to:
modify the current internal state by using a single cryptographic primitive operation and non-linear feedback function based on the current internal state and the new entropy-containing seed.

36. The machine-readable storage medium of claim 34 further having one or more instructions which when executed by a processor causes the processor to:
continuously obtain additional seeds from the one or more unpredictable sources of seed information to modify the internal state of the number generator; and
modify the internal state of the number generator based on a new seed received from a calling application.

* * * * *